March 8, 1927. 1,619,997
J. W. WHITE
MANUFACTURE OF GEARS
Filed Dec. 4, 1920 2 Sheets-Sheet 1
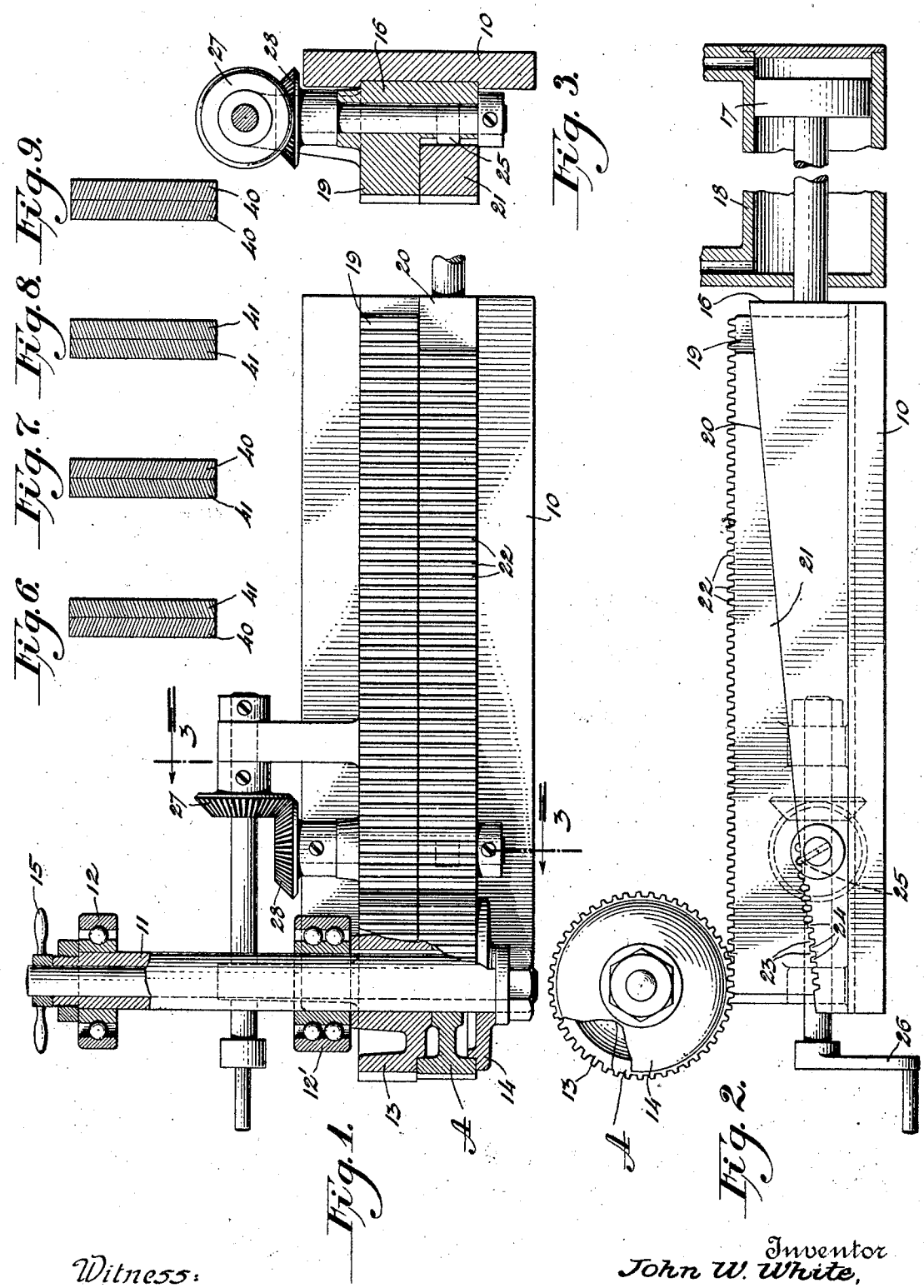
Witness:
S. L. Perna
Inventor
John W. White,
By Attorneys
Blackmore, Spencer & Flint March 8, 1927.
J. W. WHITE
1,619,997
MANUFACTURE OF GEARS
Filed Dec. 4, 1920    2 Sheets-Sheet 2
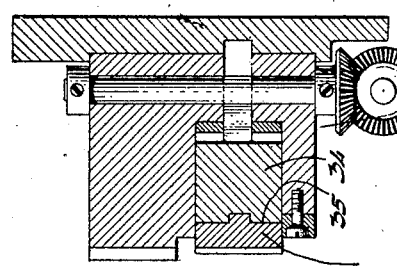
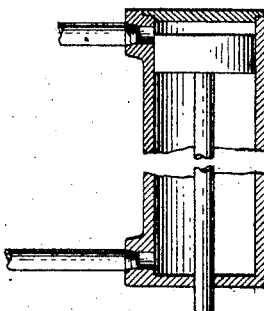
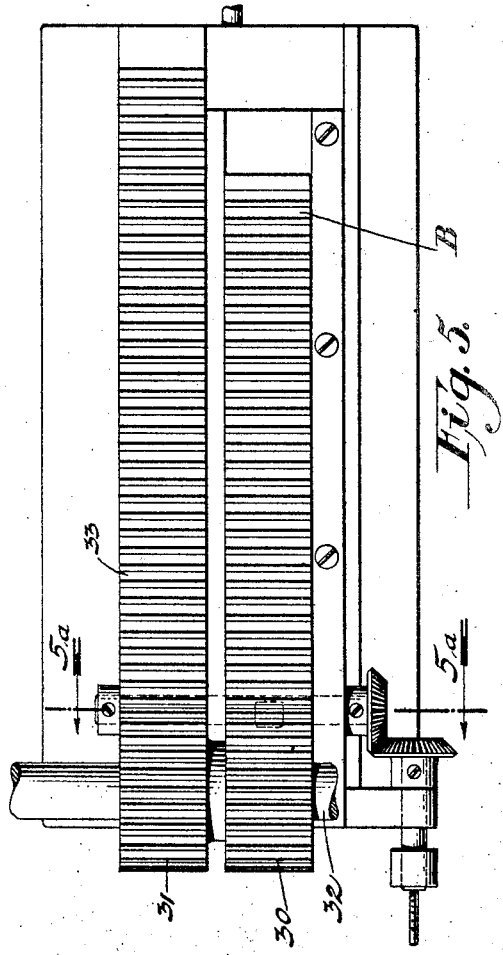
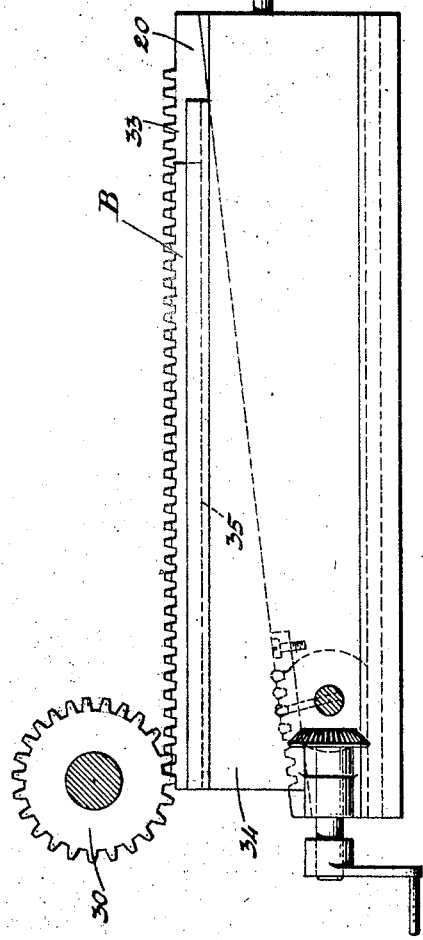
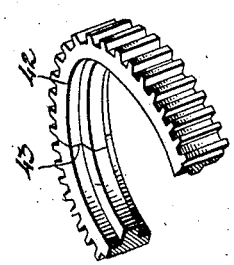
Inventor
John W. White,
By Attorneys
Blackmore, Spencer & Flint Patented Mar. 8, 1927.

1,619,997

UNITED STATES PATENT OFFICE.

JOHN W. WHITE, OF DETROIT, MICHIGAN, ASSIGNOR TO GENERAL MOTORS CORPORATION, OF DETROIT, MICHIGAN, A CORPORATION OF DELAWARE.

MANUFACTURE OF GEARS.

Application filed December 4, 1920. Serial No. 428,292.

The invention relates to means for manufacturing gears, including wheels, racks, segments, or other forms of toothed elements, by impressing upon a blank, preferably heated to increase its plasticity, the desired form of toothed contour by means of a toothed forming element.

The primary object of the invention is to provide for the forming of gear elements by the impression method with accuracy and facility. To this end the invention comprises a forming element, which may be annular, rectilinear, or of other desired contour, and a blank-supporting element, which may be mounted to rotate or reciprocate, or to have such other motion as may be necessary to bring the blank into proper engagement with the forming element. It may also include means whereby the forming element and the blank may be caused to approach each other progressively during the progress of the forming or "rolling" operation.

In the accompanying drawings:

Fig. 1 is a plan view and

Fig. 2 is an elevation of an embodiment of the invention adapted to form gear teeth upon an annular blank;

Fig. 3 is a section on line 3—3 of Fig. 1;

Figs. 4 and 5 are, respectively, a plan view and an elevation of an embodiment of the invention especially adapted to form gear teeth upon a bar, thereby producing a gear rack;

Fig. $5_a$ is a section on line $5_a$—$5_a$ of Fig. 5;

Figs. 6 to 9, inclusive, are plan views showing arrangements of sectional forming elements adapted for use in producing herringbone gear teeth, and Fig. 10 is a plan view of a gear ring formed by bending a rolled gear rack and connecting the ends.

In the structure shown in Figs. 1, 2 and 3, 10 indicates a base of any character suitable to support the machine parts. A hollow rotary spindle 11 is supported in bearings 12, 12', and has mounted thereon a master gear wheel 13. At one end the spindle is provided with any desired chuck or clamping means adapted to receive and hold against rotation relative to gear 13 a blank as indicated at A. As shown the blank is secured against the side of gear 13 by the disk 14 actuated by a connection through the hollow spindle to hand wheel 15.

A carriage 16 adapted to be reciprocated on the base 10 by any suitable means, as by the piston 17 operating in fluid pressure cylinders 18 as shown in Fig. 2, is provided with a master rack 19 and an inclined bed 20, arranged side by side. The rack 19 is so positioned that it will engage with the gear wheel 13 when the carriage is reciprocated and will thereby cause the gear and the blank A to be rotated. Upon the bed 20 is mounted a forming element 21, inclined on its lower side at the same angle as the bed 20 so that the upper surface, which is provided with the forming teeth 22, will lie parallel to the base 10.

The element 21 is normally prevented from sliding relatively to the carriage by the interengagement of teeth 23 on the element with teeth 24 on the carriage. A one-toothed gear 25, adapted to be rotated by any suitable means, as by the hand crank 26 acting through bevel pinions 27, 28, is arranged to engage the teeth 23, so that a single rotation of the gear 25 will lift the element 21 out of engagement with the carriage and move it upwardly on the inclined bed a distance equal to the pitch of the teeth 23, which is equal to that of the forming teeth 22, then permitting the element to drop back into engagement with the bed.

This operation will cause the teeth of the forming element or rack to be advanced one tooth with reference to the master rack 19, and also to be raised a distance depending upon the angle of inclination of the bed 20. This advancing and raising of the forming rack may take place after each reciprocation of the carriage thus serving to cause the forming teeth to penetrate more deeply into the blank and also to bring each tooth into engagement with a different indentation in the blank from that with which it had previously engaged. The operations of reciprocating the carriage and progressively raising the forming rack may be continued until the rack has reached the full height necessary to complete the forming of the teeth in the blank.

In the form illustrated in Figs. 4, 5 and $5_a$, I have shown an interchange in the forming element and the blank, the blank B being in this case a bar upon which rack teeth are to be rolled or impressed. The forming element is shown as a pinion 30 which may be integral with or rigidly connected to the master pinion 31 and mounted upon the spindle 32. The master pinion 31 is arranged in mesh with the master rack 33, as with pinion 13 and rack 19 in the form first described.

The wedge-shaped block 34, which corresponds to the element 21 of the first form, is provided with a seat 35 adapted to receive and hold from relative displacement the blank B. The means for operating the carriage and for raising and advancing the block 34 are the same as have been described in connection with the form of Figs. 1 to 3. The operation, as will be readily seen, is substantially identical in the two forms, except for the reversal of the relative positions of forming element and blank.

In Figs. 6 to 9, I have shown a sectional forming element particularly adapted for use in rolling herring-bone gears. The rack in this instance, which takes the place of the rack 21 of Figs. 1 to 3, is constituted of two sections, 40, 41, with the angles of the forming teeth inclined in opposite directions. In forming one of a pair of herring-bone gears these sections will be arranged side by side as shown in Fig. 6, while the arrangement to form the other gear of the pair will be as shown in Fig. 7.

When it is necessary to grind or refinish the surfaces of the teeth these sections may be arranged as shown in Figs. 8 and 9, two sections 40 or 41 being placed side by side in order to bring the teeth having similar inclination into alignment.

When the forming teeth on either a forming pinion or a forming rack have been ground or re-surfaced thereby decreasing the initial distance to which the teeth project the carriage or the wedge-shaped block carried thereby may be adjusted to a slightly higher position by the use of shims.

The racks rolled or impressed as above described may be used as rectilinear gear elements or may be bent to segmental or other form if desired. This method of manufacture may be employed for example in the production of annular gears, or gear rings, the rectilinear element being merely bent to annular form as shown at 42, Fig. 10, and its ends connected in any suitable manner. Where it is desirable that the ring shall be continuous the ends may be connected by welding as indicated at 43, as by the electrical butt-welding process. The blank employed may be rolled to any desired cross-section which may be required for the completed ring, as will be obvious.

It will be understood that various changes may be made in the details of construction and operation without departing from the spirit of the invention and the scope thereof as set forth in the following claims, and therefore I do not wish to be limited to the specific details above described.

I claim:—

1. In means for forming gears, the combination of a toothed forming element and a blank-supporting means, one mounted to rotate and the other to reciprocate, gearing for connecting said element to said means to cause their operation in synchronism, and means for causing the forming element and the blank to approach each other progressively and for shifting the reciprocating member on its support to bring each forming tooth into engagement with a different indentation in the blank on the next reciprocation.

2. In means for forming gears the combination of a reciprocating carriage, a toothed forming element and a blank-supporting element one carried by said carriage and the other rotatable on a fixed axis, and means for moving the element supported on the carriage progressively toward said fixed axis and for changing the position of the same longitudinally relative to the other element and to the carriage.

3. In means for forming gears the combination of a reciprocating carriage having an inclined bed thereon, a blank-supporting element mounted upon said bed, said element and carriage having interengaging parts adapted normally to prevent relative sliding movement, and rotating means adapted to disengage said element from said carriage and move it along said inclined bed.

4. The method of forming a pair of co-operating herring bone or like gears consisting in acting upon a blank with a forming element composed of a pair of toothed sections arranged side by side, the teeth of one section being inclined oppositely from those of the other section interchanging the position of the tooth sections so that the teeth are in reversed relation, and forming the cooperating gear in a similar manner but with the forming element sections arranged in reversed relation.

5. In means for forming gears the combination of a reciprocating carriage, a toothed forming element and a blank-supporting element, one carried by said carriage and the other rotatable on a fixed axis, and means for shifting one of said elements bodily in the direction of movement of said carriage and relatively thereto between successive forming operations to bring each forming tooth into engagement with a different indentation in the blank in successive forming operations.

6. In means for forming gears the combination of a reciprocating carriage having a master rack, a master gear adapted to engage said rack, a toothed forming element mounted to rotate with said master gear, a wedge-shaped block on said carriage for supporting a rack blank, and means for adjusting said block comprising an inclined bed, and means for moving said block longitudinally on said bed.

7. An apparatus for the rolling of herringbone gear teeth in a plastic metal blank, comprising a pair of interchangeable toothed sections arranged side by side and having their teeth inclined oppositely, said sections adapted by said interchange of position to form either one of a pair of meshing herringbone gears, and means for supporting a metal blank in position to engage said sections.

In testimony whereof I affix my signature.

JOHN W. WHITE.